United States Patent Office

3,415,657
Patented Dec. 10, 1968

3,415,657
YEAST REMOVAL FROM VESSELS BY
FLUIDITY INCREASE
Cavit Akin, St. Louis, Mo., assignor to Falstaff Brewing
Corporation, St. Louis, Mo., a corporation of Delaware
No Drawing. Continuation-in-part of application Ser. No.
473,211, July 19, 1965. This application Aug. 3, 1967,
Ser. No. 658,063
10 Claims. (Cl. 99—96)

ABSTRACT OF THE DISCLOSURE

Removal of yeast from a vessel or fermenter by increasing the fluidity of the yeast slurry with a solution of a suitable acid or base character such that the viscosity of the slurry is conditioned to allow easy flow, and for this purpose phosphoric acid accomplishes the desired result and also helps disinfection and nutrition of the yeast.

---

This application is a continuation-in-part of my prior application, Ser. No. 473,211, filed July 19, 1965 now abandoned.

This invention relates to yeast removal, and more particularly to yeast removal from fermenters by altering the viscosity of yeast slurry remaining in a fermenter after the fermentation product, such as beer, has been removed.

Heretofore yeast removal from fermenters, after fermentation products, such as beer, have been withdrawn, was a time consuming and expensive task particularly when the yeast slurry was to be recovered and reused. After beer fermentation, the remaining yeast settles to the bottom of the fermenter tank and forms a pseudo-plastic mass. This yeast mass remains attached to the bottom of the fermenter even in pitched bottom fermenters and moves to the lowest end very slowly. Most prior processes for removing yeast slurry from fermenters included excessive dilution of the yeast slurry or manual scraping of the fermenter tank. Some fermenters are equipped with spray nozzles to dilute and wash the yeast slurry from the fermenter. Hence, additional handling and settling of the yeast was required.

The present invention overcomes the difficulties of prior techniques and eliminates the necessity for such time consuming and expensive processes. Briefly, the invention contemplates reducing the consistency of the yeast slurry without excessive dilution by adding a sufficient quantity of 1 to 10 normal alkali or acid solution to yeast slurry based on the yeast slurry having 14 to 17 percent total solids to provide 1 to 10 equivalent weights of alkali or acid per 100 pounds of yeast slurry. Hence, with relatively nominal solution additions, the increase in fluidity is substantial. The fluidity change is attributable mainly to the degree of hydrolysis which occurs from acid or alkali additions to the yeast slurry rather than the change in pH.

It is therefore an important object of the invention to provide a process for yeast removal from fermenters which is economical and simple, yet highly effective.

It is another object of the invention to provide a method of removing yeast slurry from a fermentation tank by reducing the consistency of the yeast slurry without excessive dilution.

It is still another object of the invention to provide a method of removing yeast slurry from fermentation tanks by adding nominal amounts of acid or alkaline control solutions to increase fluidity of the yeast slurry without significant dilution thereof, and draining the yeast slurry from the fermentation tanks.

It is still another object of the invention to provide a method of removing yeast slurry from fermentation tanks by spraying acid or alkaline control solution in nominal amounts onto the yeast slurry in the bottom of a fermentation vessel to increase the fluidity of the yeast slurry sufficient to permit drainage from the fermentation vessel.

It is still another object of the invention to provide a method of removing yeast slurry from fermentation vessels which includes reducing the consistency of the yeast slurry by adding nominal amounts of a basic solution to the yeast slurry and thereafter draining the yeast slurry from the fermentation vessels.

It is still another object of the invention to provide a method of removing yeast slurry from fermentation vessels which includes increasing the fluidity of the yeast slurry with nominal additions of an acidic solution to the yeast slurry and thereafter draining the yeast slurry from the fermentation tanks.

Other objects and advantages of the invention will be readily appreciated from the ensuing detailed description of the invention in conjunction with the appended claims.

In accordance with the usual fermentation process, when the fermentation process is completed and the yeast settles to the bottom of the fermentation vessel, the fermentation product or beer is withdrawn from the fermentation vessel and the yeast slurry remains attached to the bottom of the fermentation vessel as a pseudo-plastic mass. In accordance with the present invention, the pseudo-plastic mass or yeast slurry is treated preferably with about one (1) to ten (10) equivalent weight alkali per 100 pounds of yeast slurry at 14 to 17 percent solids. The equivalent weight is added in solution from a 1 to 10 normal alkali solution. The alkali solution preferably is sodium hydroxide; however, it may be any suitable alkaline solution. Moreover, the consistency control solution may be an acid. About one (1) to ten (10) equivalent weights acid per 100 pounds of yeast slurry at 14 to 17 percent solids may be used to achieve consistency control. The equivalent weight is added in solution from a one (1) to ten (10) normal acid solution. Any suitable acid such as hydrochloric acid may be used. The slurry usually has a pH of 4 to 5 and when treated with acid a pH of 3 or less; when treated with alkaline solution a pH of 6 to 8. However, the final pH is not as significant as the degree of hydrolysis of inter-cell material accomplished from the acid or alkaline additions.

Although hydrochloric acid or any suitable acid can be used, the use of phosphoric acid may be preferred in certain cases due to its widespread acceptance in food processing. Phosphoric acid is commonly applied to disinfect the yeast; also the phosphate ions of the phosphoric acid is utilized by yeast as a nutrient. Thus, the application of phosphoric acid for the automatic removal of yeast also helps disinfection and nutrition of the yeast. Phosphoric acid should be added at a rate of about one (1) to ten (10) equivalent weights in form of a water or beer solution per 100 pounds of yeast.

The process of yeast slurry removal may be accomplished by dispersing the control alkaline or acid solution over the surface of the yeast slurry without the necessity of mixing the yeast slurry. In fermentation vessels equipped with spray rinses, the control solution may be introduced through such spray apparatus. Likewise, portable spray apparatus may be used to disperse the control solution. Once the consistency control solution has been added, the yeast slurry may be readily withdrawn from the fermentation vessel quickly and completely. After the yeast slurry has been withdrawn the pH may be readjusted to between a pH of 4 to 5. Thus, hydrolysis of the yeast slurry is prevented, although the consistency of the yeast slurry does not return to the initial consistency that it had in the fermentation vessel prior to treatment.

The specific examples hereinafter set forth fully illustrate the effectiveness of the process.

Example I

Samples of yeast slurry from a fermentation vessel with a pH between 4 to 5 and total solids of 14 to 17 percent were used with various one (1) ml. additions of water and acid solutions to determine the change in consistency of the yeast slurry. The yeast slurries were mixed and without delay, for purposes of comparison, Bostwick consistometer readings of distance travelled per unit of time were determined. The samples with results are tabulated in Table I below.

TABLE I

| Sample No. | Wt. (gm.) | 1 ml. Additions | Slurry pH | Consistometer Results CM Travelled per minute | | | |
|---|---|---|---|---|---|---|---|
| | | | | ½ | 1 | 1½ | 2 |
| 1 | 30.9 | 1N HCl | 2.10 | 18 | 21 | 22.5 | 23.5 |
| 2 | 28.9 | 2N HCl | 1.80 | 16 | 18 | 20 | 20 |
| 3 | 30.4 | 3N HCl | 1.08 | 15 | 17 | 18 | 19 |
| 4 | 28.7 | Water [1] | 4.2 | 6.5 | 7.5 | 8.5 | 9 |

[1] Control addition.

It will be observed from Table I that the fluidity of yeast slurry with acid addition increased markedly over the water addition control sample with very nominal dilution.

Example II

Samples of yeast slurry as used in Example I were prepared with various one (1) ml. additions of water and basic solutions. The yeast slurry was 14% solid based on oven dried sample weight. Again the Bostwick Consistometer was used to determine changes in consistency of the yeast slurries immediately after mixing. The samples with results are tabulated in Table II below.

TABLE II

| Sample No. | Wt. (gm.) | 1 ml. Additions | Final pH | Consistometer Results CM Travelled per minute | | | |
|---|---|---|---|---|---|---|---|
| | | | | ½ | 1 | 1½ | 2 |
| 5 | 39.2 | Water | 4.02 | 5½ | 6 | 7 | 7½ |
| 6 | 37.6 | 0.001N NaOH | 4.35 | 6½ | 7½ | 8 | 8 |
| 7 | 35.5 | 0.01N NaOH | 4.54 | 6½ | 7½ | 8 | 8½ |
| 8 | 39.5 | 0.02N NaOH | 4.5 | 7 | 8 | 8½ | 9 |
| 9 | 37.9 | 0.04N NaOH | 4.52 | 5½ | 6½ | 7 | 7½ |
| 10 | 37.5 | 0.06N NaOH | 4.75 | 6 | 7 | 7½ | 8 |
| 11 | 37.7 | 0.1N NaOH | 4.70 | 6½ | 7½ | 8 | 8½ |
| 12 | 38.6 | 0.2N NaOH | 4.98 | 6 | 7½ | 8 | 8½ |
| 13 | 36.9 | 0.5N NaOH | 5.63 | 7 | 8½ | 9 | 10 |
| 14 | 37.5 | 1.0N NaOH | 6.5 | 9 | 10½ | 11 | 11½ |

It will be observed from Table II that Sample 14 underwent a significant increase in fluidity.

Example III

Example II was repeated using 1 to 5 N sodium hydroxide along with a water addition control sample. The samples and results obtained with the Bostwick Consistometer are tabulated in Table III below.

TABLE III

| Sample No. | Wt. (gm.) | 1 ml. Additions | Final pH | Consistometer Results CM Travelled per minute | | | |
|---|---|---|---|---|---|---|---|
| | | | | ½ | 1 | 1½ | 2 |
| 15 | 66.70 | 1N NaOH | 5.42 | 15½ | 17 | 18½ | 19 |
| 16 | 67.35 | 2N NaOH | 5.55 | 17 | 19 | 20 | 21 |
| 17 | 65.77 | 3N NaOH | 6.88 | 20 | 21½ | 22½ | 23½ |
| 18 | 66.95 | 4N NaOH | 7.52 | 22 | 23½ | 24 | |
| 19 | 66.60 | 5N NaOH | 7.0 | 18 | 20 | 21½ | 22½ |
| 20 | 65.56 | Water | 4.4 | 10 | 11½ | 13 | 13½ |

Generally, it will be noted from Table III that as the normality of NaOH solution increased fluidity of the yeast slurries increased markedly. The best fluidity value was obtained with 4 N NaOH.

Example IV

In the preceeding Examples I, II and III the yeast slurry was mixed with the acidic or alkali solution and the consistency was determined right away. However, it is known that the plastic charatcer of yeast changes as it is stirred. In this example, the yeast slurry was allowed a rest time of 20 minutes at 3° C. in the Bostwick Consistometer prior to dispersing 1 ml. of 4 N Sodium Hydroxide solution on the surface of each sample of the yeast slurry. The consistency was determined at 3° C. after contact times of ½ to 5 minutes. The samples and results are tabulated in Table IV below.

TABLE IV

| Sample No. | Wt. (gm.) | Contact Time after Dispersing Additive | Consistometer Results CM Travelled per minute | | | |
|---|---|---|---|---|---|---|
| | | | ½ | 1 | 1½ | 2 |
| 21 | 65.72 | 2 minutes | 17½ | 20½ | 22 | 23½ |
| 22 | 67.10 | 1 minute | 13½ | 15½ | 17 | 19½ |
| 23 | 62.70 | ½ minute | 13 | 14½ | 16 | 17 |
| 24 | 66.78 | 1½ minute | 13 | 15½ | 16½ | 18 |
| 25 | 63.50 | 5 minutes | 13½ | 15 | 16 | 17 |

The data in Table IV indicates that 2 minutes contact time was the best, however, all the times were adequate to permit quick removal of yeast slurry of such consistency from a fermentation vessel.

Example V

This example illustrates that additions of alkali to yeast slurry and readjusting the pH to the initial value of the yeast slurry does not affect the fermentation. In this example 1 ml. of 1 N sodium hydroxide was added to about 30 grams of yeast slurry (approximately 15% solids) and kept in contact for four hours. Then, the pH was adjusted to about 4 by addition of 1 N HCl. A sample of 8 grams of the readjusted pH yeast slurry was added to a 1000 ml.

sample of wort. A control sample of 8 grams of untreated yeast slurry was added to a 1000 ml. sample of wort. Both samples were allowed to ferment. The fermentation time and results are tabulated in Table V below.

TABLE V

| Time, hours | 0 | 17 | 22 | 24 | 29 | 44 | 49 | 65 | 70 |
|---|---|---|---|---|---|---|---|---|---|
| Test Sample, Percent Total Solids | 11.5 | 9.6 | | 8.5 | | 7.1 | | 6.5 | |
| Control Sample, Percent Total Solids | 11.5 | | 8.5 | | 8.0 | | 7.4 | | 6.5 |

From the data in Table V, it will be noted that the fermentation was relatively unaffected by alkali additions and readjustment of pH. The test sample started slower, but finished faster than the control sample.

Example VI

Samples of yeast slurry from a fermentation vessel with a pH between 4 to 5 and total solids of 14 to 17 percent were used for various one ml. additions of water and phosphoric acid at different concentrations to determine the change in consistency of the yeast slurry. The yeast slurries were mixed and without delay, for purpose of comparison, Bostwick consistometer readings of distance travelled per unit time were determined. The samples with results are tabulated in Table VI.

TABLE VI.—BOSTWICK CONSISTOMETER MEASUREMENTS WITH YEAST SLURRY—PHOSPHORIC ACID MIXTURES (3° C.)

| Sample No. | Wt. (gm.) | 1 ml. Phosphoric Acid Sol'n Added | Final pH | Consistometer Results CM Travelled per minute | | | |
|---|---|---|---|---|---|---|---|
| | | | | ½ | 1 | 1½ | 2 |
| Control | 29.0 | (1) | 3.5 | 4.5 | 5.0 | 5.5 | 6.0 |
| 1 | 29.9 | 1N | 3.1 | 8.5 | 10.2 | 11.0 | 11.5 |
| 2 | 30.3 | 2N | 2.7 | 9.5 | 10.5 | 11.0 | 11.7 |
| 3 | 30.4 | 3N | 2.1 | 15.5 | 17.0 | 17.7 | 18.0 |

[1] Distilled water.

It will be observed from Table VI that the fluidity of yeast slurry with phosphoric acid addition increased markedly over the water addition control sample with very nominal dilution.

Example VII

This example illustrates the increase in fluidity achieved by the invention. Two samples of yeast slurry of 1000 ml. each were placed on trays to form one inch deep layers. The trays were tilted at an angle of about 2.4°. The samples were maintained at 3° C. for 4 hours and the test was performed at 3° C. One sample surface was sprayed with 10 ml. of 5 N sodium hydroxide solution from an atomizer and the yeast slurry was removed by suction at the lowermost end of the tray. By using intermittent sprays, 90% of the yeast slurry was removed within 10 minutes. The other sample surface was squirted with 5 ml. of 5 N sodium hydroxide solution from a wash bottle. This arrangement provided a pressure impact. Although the entire surface of the yeast did not have direct contact with the sodium hydroxide solution, large areas of the sample flowed. When stirred, the entire sample became fluid.

It will therefore be understood that the method of reducing the consistency of yeast slurry may be readily accomplished in fermentation vessels equipped with spray apparatus by intermittently spraying the yeast slurry with 1 to 3 N acid solution or 1 to 5 N alkali solution. Of course portable spray equipment may be used. Also the desired fluidity can be accomplished by mixing the acid or alkali solution in the fermentation vessel. Once the yeast slurry has been removed from the fermentation vessel, it may be readjusted to the previous pH concentration to eliminate yeast hydrolysis.

It will be understood that the foregoing is illustrative of the invention, and the acids and alkalies used are not limited to HCl or NaOH, and as well, the invention is not limited to any particular apparatus for making additions of such acids and alkalies.

Various modifications and changes will be apparent from the foregoing, and all such modifications and changes are deemed to be within the scope of the invention as defined in the appended claims.

What is claimed is:

1. A method of removing yeast slurry from a vessel comprising the steps of increasing the fluidity of the yeast slurry in said vessel by changing the pH thereof with the addition of a sufficient quantity of an acid solution to bring the pH downward to less than about 3 and thereafter removing the fluidized yeast from the vessel.

2. The method set forth in claim 1 wherein the quantity of said acid solution contains one equivalent weight of the acid for between 10 to 100 pounds of the yeast slurry based on said slurry having 14 to 17% total solids.

3. The method set forth in claim 1 wherein the concentration of the acid to be added is about 1 normal to 10 normal.

4. The method set forth in claim 1 wherein the acid solution is hydrochloric.

5. The method set forth in claim 1 wherein the acid solution is phosphoric.

6. A method of removing yeast slurry from a vessel comprising the steps of increasing the fluidity of the yeast slurry in said vessel by changing the pH thereof with the addition of a sufficient quantity of an alkali solution to bring the pH upward to more than about 6 and thereafter removing the fluidized yeast from the vessel.

7. The method set forth in 6 wherein the quantity of said alkali solution contains one equivalent weight of the alkali for between 10 to 100 pounds of the yeast slurry based on said slurry having 14 to 17% total solids.

8. The method set forth in claim 6 wherein the concentration of the alkali to be added is about 1 normal to 10 normal.

9. The method set forth in claim 6 wherein the alkali solution is potassium hydroxide.

10. The method set forth in claim 6 wherein the alkali solution is sodium hydroxide.

References Cited

UNITED STATES PATENTS 2,609,328  9/1952  Reed _____ 195—74 X
3,117,005  1/1964  Coutts _____ 99—31 X
3,186,922  6/1965  Champagnat _____ 99—96 X LIONEL M. SHAPIRO, *Primary Examiner.*

D. M. NAFF, *Assistant Examiner.*

U.S. Cl. X.R.

195—82, 74